US009372523B2

(12) United States Patent
Furukawa

(10) Patent No.: US 9,372,523 B2
(45) Date of Patent: Jun. 21, 2016

(54) CALCULATING AMOUNT OF POWER CONSUMED BY A USER'S APPLICATION IN MULTI-USER COMPUTING ENVIRONMENT BASING UPON COUNTERS INFORMATION

(71) Applicant: FUJITSU LIMITED, Kawasaki-shi (JP)

(72) Inventor: Eiji Furukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 243 days.

(21) Appl. No.: 13/727,985

(22) Filed: Dec. 27, 2012

(65) Prior Publication Data

US 2013/0117596 A1 May 9, 2013

Related U.S. Application Data

(63) Continuation of application No. PCT/JP2010/061150, filed on Jun. 30, 2010.

(51) Int. Cl.
G06F 1/32 (2006.01)
G06F 11/34 (2006.01)
G06F 1/26 (2006.01)

(52) U.S. Cl.
CPC .............. G06F 1/3206 (2013.01); G06F 1/26 (2013.01); G06F 11/3409 (2013.01); G06F 11/3466 (2013.01); G06F 2201/865 (2013.01); G06F 2201/88 (2013.01); Y02B 60/165 (2013.01)

(58) Field of Classification Search
CPC . G06F 11/3058; G06F 11/3062; G06F 11/34; G06F 1/30; G06F 11/3003; G06F 9/455
USPC ......................................................... 713/340
See application file for complete search history.

(56) References Cited

U.S. PATENT DOCUMENTS

| 5,875,449 | A  | * | 2/1999 | Ono ............................... 711/100 |
| 6,021,502 | A  | * | 2/2000 | Ando ............................ 713/340 |
| 6,096,089 | A  | * | 8/2000 | Kageshima ...................... 703/18 |
| 6,513,145 | B1 | * | 1/2003 | Venkitakrishnan ............ 716/109 |
| 6,810,482 | B1 | * | 10/2004 | Saxena et al. .................. 713/320 |
| 6,820,222 | B2 | * | 11/2004 | Swoboda ......................... 714/33 |

(Continued)

FOREIGN PATENT DOCUMENTS

| JP | 11-161692 | 6/1999 |
| JP | 2001-318807 | 11/2001 |

(Continued)

OTHER PUBLICATIONS

Japanese Office Action mailed Apr. 9, 2013 for corresponding Japanese Application No. 2012-522384.

(Continued)

*Primary Examiner* — Thomas Lee
*Assistant Examiner* — Santosh R Poudel
(74) *Attorney, Agent, or Firm* — Staas & Halsey LLP

(57) ABSTRACT

The processing unit calculates usage amount of a program from a used amount of the processing unit and a power amount of the processing unit. The processing unit initializes a performance counter at a start of a execution of the program, calculates power amount of the program from the measured power consumption stored in the storage unit and the number of times of each event counted by the performance counter at a completion of execution of the program, and calculates usage of the program from the usage amount of the processing unit and calculated the power amount.

16 Claims, 14 Drawing Sheets

(56) References Cited

U.S. PATENT DOCUMENTS

| | | |
|---|---|---|
| 7,149,636 B2 | 12/2006 | Cyran et al. |
| 7,290,246 B2 | 10/2007 | Cyran et al. |
| 7,337,433 B2 | 2/2008 | Cyran et al. |
| 7,340,378 B1 | 3/2008 | Floyd et al. |
| 7,660,974 B2* | 2/2010 | Kimura ............... 712/227 |
| 8,230,059 B1* | 7/2012 | Santos et al. .......... 709/224 |
| 8,397,087 B1* | 3/2013 | Gardner ........... G06F 1/329 |
| | | 713/300 |
| 2002/0053013 A1* | 5/2002 | Sollars ................ 712/11 |
| 2003/0101443 A1* | 5/2003 | Kosche et al. ........... 717/158 |
| 2003/0125900 A1* | 7/2003 | Orenstien et al. ........ 702/132 |
| 2003/0135380 A1* | 7/2003 | Lehr et al. .............. 705/1 |
| 2004/0181469 A1* | 9/2004 | Saeki ............... H04L 29/06 |
| | | 705/30 |
| 2004/0268159 A1* | 12/2004 | Aasheim et al. ......... 713/300 |
| 2005/0166204 A1* | 7/2005 | Takatsu ........... G06F 11/3466 |
| | | 718/100 |
| 2006/0101297 A1* | 5/2006 | Naik ................ 713/320 |
| 2007/0136720 A1* | 6/2007 | Roy et al. ............. 717/140 |
| 2007/0192157 A1* | 8/2007 | Gooch ......... G06Q 10/063112 |
| | | 705/7.14 |
| 2007/0220292 A1* | 9/2007 | Ishihara et al. .......... 713/320 |
| 2008/0022140 A1 | 1/2008 | Yamada et al. |
| 2008/0172549 A1* | 7/2008 | Caprioli et al. .......... 712/216 |
| 2008/0250237 A1* | 10/2008 | Sebesta et al. .......... 713/153 |
| 2009/0113178 A1* | 4/2009 | Kim et al. ............. 712/205 |
| 2009/0125913 A1* | 5/2009 | Bradford et al. ......... 718/108 |
| 2009/0171646 A1* | 7/2009 | Silbermintz ........ G06F 11/3616 |
| | | 703/16 |
| 2009/0177902 A1* | 7/2009 | Naik ................ 713/320 |
| 2009/0217277 A1* | 8/2009 | Johnson et al. .......... 718/102 |
| 2009/0300399 A1* | 12/2009 | Archer et al. .......... 713/340 |
| 2009/0313155 A1* | 12/2009 | Sawada et al. ......... 705/34 |
| 2010/0005326 A1* | 1/2010 | Archer et al. .......... 713/320 |
| 2010/0058079 A1* | 3/2010 | Yamamoto et al. ....... 713/300 |
| 2010/0325191 A1* | 12/2010 | Jung et al. ............ 709/202 |
| 2010/0328849 A1* | 12/2010 | Ewing et al. ........... 361/622 |
| 2011/0016455 A1* | 1/2011 | Perry et al. ............ 717/130 |
| 2011/0072378 A1* | 3/2011 | Nurminen et al. ........ 715/771 |
| 2011/0218690 A1* | 9/2011 | O'Callaghan et al. ...... 700/295 |
| 2011/0244901 A1* | 10/2011 | Sugahara .......... H04W 16/18 |
| | | 455/501 |
| 2011/0264418 A1* | 10/2011 | Szewczyk et al. ........ 703/2 |

FOREIGN PATENT DOCUMENTS

| | | | |
|---|---|---|---|
| JP | 2003-345472 | 12/2003 | |
| JP | 2005-25754 | 1/2005 | |
| JP | 2005-266845 | 9/2005 | |
| JP | 2007-249974 | 9/2007 | |
| JP | 2008-26948 | 2/2008 | |
| JP | WO 2010067560 A1 * | 6/2010 | ........... H04W 16/18 |

OTHER PUBLICATIONS

International Search Report of Corresponding PCT Application PCT/JP2010/061150 mailed Sep. 28, 2010.

* cited by examiner

| EVENT | POWER CONSUMPTION |
|---|---|
| INT_INS | 100mW |
| FP_INS | 200mW |
| L1_TCM | 300mW |
| TLB_TL | 400mW |

16A

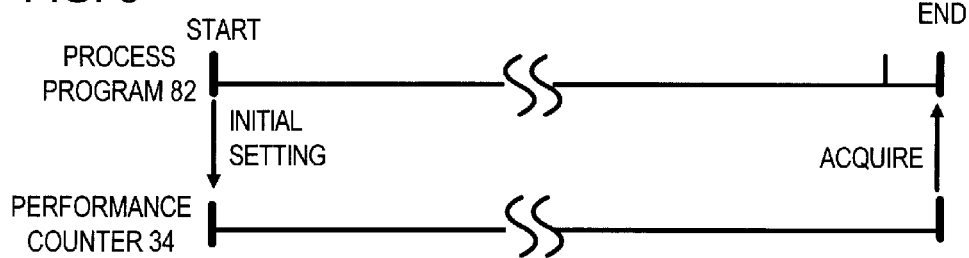
FIG. 8
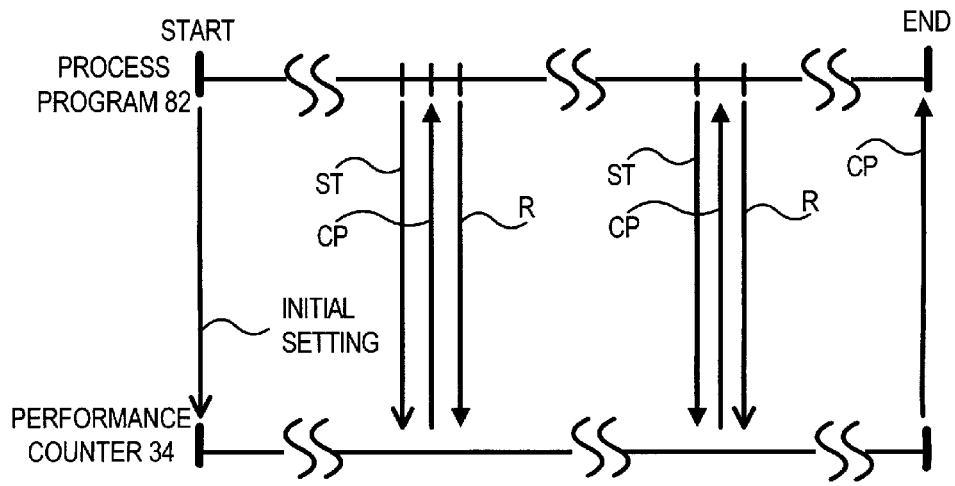
FIG. 9
FIG. 10

| TIME | INT_INS | FP_INS | L1_TCM | TLB_TL |
|------|---------|--------|--------|--------|
| 1 | 1 | 0 | 0 | 0 |
| 2 | 0 | 1 | 1 | 1 |
| 3 | 1 | 0 | 0 | 0 |
| 4 | 1 | 0 | 0 | 0 |
| 5 | 0 | 1 | 0 | 0 |
| 6 | 1 | 0 | 0 | 0 |
| 7 | 1 | 0 | 0 | 0 |
| 8 | 0 | 1 | 0 | 0 |
| 9 | 1 | 0 | 0 | 0 |

```
struct acct {
  int ac_uid;    /* USER ID */
  int ac_utime;  /* USER CPU TIME */
  int ac_stime;  /* SYSTEM CPU TIME */
  int ac_etime;  /* ACTUAL TIME ELAPSED FROM THE START TO THE END */
  int ac_mem;    /* AVERAGE AMOUNT OF MEMORY USAGE */
  int ac_power:  /* POWER AMOUNT */
```

| USER NAME | THE NUMBER OF EXECUTION OF COMMAND | ACTUAL TIME | EXECUTION TIME | AVERAGE AMOUNT OF MEMORY USAGE | POWER AMOUNT |
|---|---|---|---|---|---|
| TOTAL | 30 | 360.00re | 3.00cp | 8000k | 30.00p |
| USER1 | 10 | 120.00re | 1.00cp | 8000k | 10.00p |
| USER2 | 20 | 240.00re | 2.00cp | 8000k | 20.00p |
| ACCOUNT = a*v + b*w + c*x + d*y +e*z ||||||

CALCULATING AMOUNT OF POWER CONSUMED BY A USER'S APPLICATION IN MULTI-USER COMPUTING ENVIRONMENT BASING UPON COUNTERS INFORMATION

CROSS-REFERENCE TO RELATED APPLICATION

This application is a continuation application of International Application PCT/JP2010/061150 filed on Jun. 30, 2010 and designated the U.S., the entire contents of which are incorporated herein by reference.

FIELD

The embodiments discussed herein are related to a method of analyzing a usage amount of an information processing device, the information processing system and a computer readable recording medium.

BACKGROUND

In recent years, environmental issues is one of the important social issues, and it is an important issue to reduce energy consumption among them. Any information processing device (computer) consumes powers for running. In particular, a large computer consumes greater power.

For analysis of the power consumption of the computer, it has been proposed to use hardware mechanism as the performance counter. The performance counter can measure the number of occurrences of a particular event, such as a cache miss.

For example, a first method is to update the performance counter by adding weights to the value of the events that occur in each functional block within the processor. The power consumption of the processor is predicted by using the value of this performance counter. Another method is to determine the power consumption by a temperature from the temperature sensor provided to the processor and an operating rate by the performance counters. These proposals are effective to monitor the power consumption of the computer.

Further, the another method is for tuning the program by embedding a special code to the program to be measured and displaying a time series relationship between the program and the power values which are measured using a power meter at a timing to execute the special code of the program.

PATENT DOCUMENT

U.S. Pat. No. 7,340,378 B1,
Japanese Laid-on Patent Publication No. 2008-026948,
Japanese Laid-on Patent Publication No. 2003-345472,
Japanese Laid-on Patent Publication No. 2005-025754

On the other hand, in an environment where many users use a large computer, it is desired to calculate the usage amount in which the user has used the computer. For example, in the large computer that many users are running individual programs, it is performed to calculate the usage amount such as amount of charge according to processing times of a central processing unit (CPU). However, in the large computer which is used by a large number of users, a ratio of power rates in the cost of the operation becomes high due to a high speed of the computer.

In addition, because capital investment of an air conditioning equipment and a power unit of the large computer and amount of a basic power rate are determined by the magnitude of the maximum power consumption, the cost will make high when the maximum power consumption is greater even the amount of power is small.

Since the power analysis method in the related art primary was used to tune the program and to monitor the computer programs, the analyzed power amount was not linked to usage amount of the large computer. For this reason, for users of the large computer, incentive to shorten the processing time of the CPU will also work, but the incentive to reduce the power rates (amount of the power) or maximum power consumption were not working.

SUMMARY

According to an aspect of the embodiments, a method of analyzing usage amount of the information processing device includes, initial setting for a performance counter which counts the number of times for each event at a start of program execution by a processing unit, storing in a storage unit the number of times of each events in the performance counter at a completion of execution of the program by the processing unit, calculating power consumption of the program from previously measured power consumption at a time of occurrence of each event which is stored in the storage unit and the number of times of each events by the processing unit, and calculating usage amount of the program from the amount of use of the processing unit and calculated the power consumption.

According to another aspect of the embodiments, an information processing system includes a processing unit which executes a program that has been requested by the user and counts the number of times for each event occurred by the execution of the program, and a storage unit which stores information needed to execute the program including power consumption at the time of occurrence of each the event which are pre-measured. And the processing unit initial sets for the performance counter at a start of program execution, stores in the storage unit the number of times for each event in the performance counter at a completion of execution of the program, calculates power amount of the program from the measured power consumption stored in the storage unit and the number of times for event, and calculates usage amount of the program from the amount of use of the processing unit and calculated the power amount.

Furthermore, according to the other aspect of the embodiments, a computer readable recording medium having stored therein a program for causing a computer to execute a digital signature process includes initial setting for a performance counter which counts the number of times for each event at a start of program execution by a processing unit, storing in a storage unit the number of times for each event in the performance counter at a completion of execution of the program by the processing unit, calculating power amount of the program from previously measured power consumption at a time of occurrence of each event which is stored in the storage unit and the number of times for each event by the processing unit, and calculating usage amount of the program from the amount of use of the processing unit and calculated the power amount.

The object and advantages of the invention will be realized and attained by means of the elements and combinations part particularly pointed out in the claims.

It is to be understood that both the foregoing general description and the following detailed description are exemplary and explanatory and are not restrictive of the invention.

BRIEF DESCRIPTION OF THE DRAWINGS

FIG. 8 is an explanatory diagram of the measurement processing of the number of occurrences of the events in FIG. 3 according to a first embodiment;

FIG. 9 is an explanatory diagram of results of a measurement process of the number of occurrences of the events in FIG. 8;

FIG. 10 is an explanatory diagram of the measurement processing of the number of occurrences of the events in FIG. 3 according to a second embodiment;

FIG. 18 is an explanatory diagram of the structure of accounting information in FIG. 16 and FIG. 17;

FIG. 19 is an explanatory diagram of accounting information file in FIG. 16 and FIG. 17;

DESCRIPTION OF EMBODIMENTS

Hereinafter, embodiments will be explained in the order of an information system, a first embodiment of analysis of power usage amount, calculation of power usage amount, a second embodiment of the analysis of power usage amount, calculation processing of usage amount added the power usage amount, a third embodiment of the analysis of power usage amount, and the other embodiments, but the information processing system and the CPU core are not limited to these embodiments.

An Information Processing System

Figure 1:
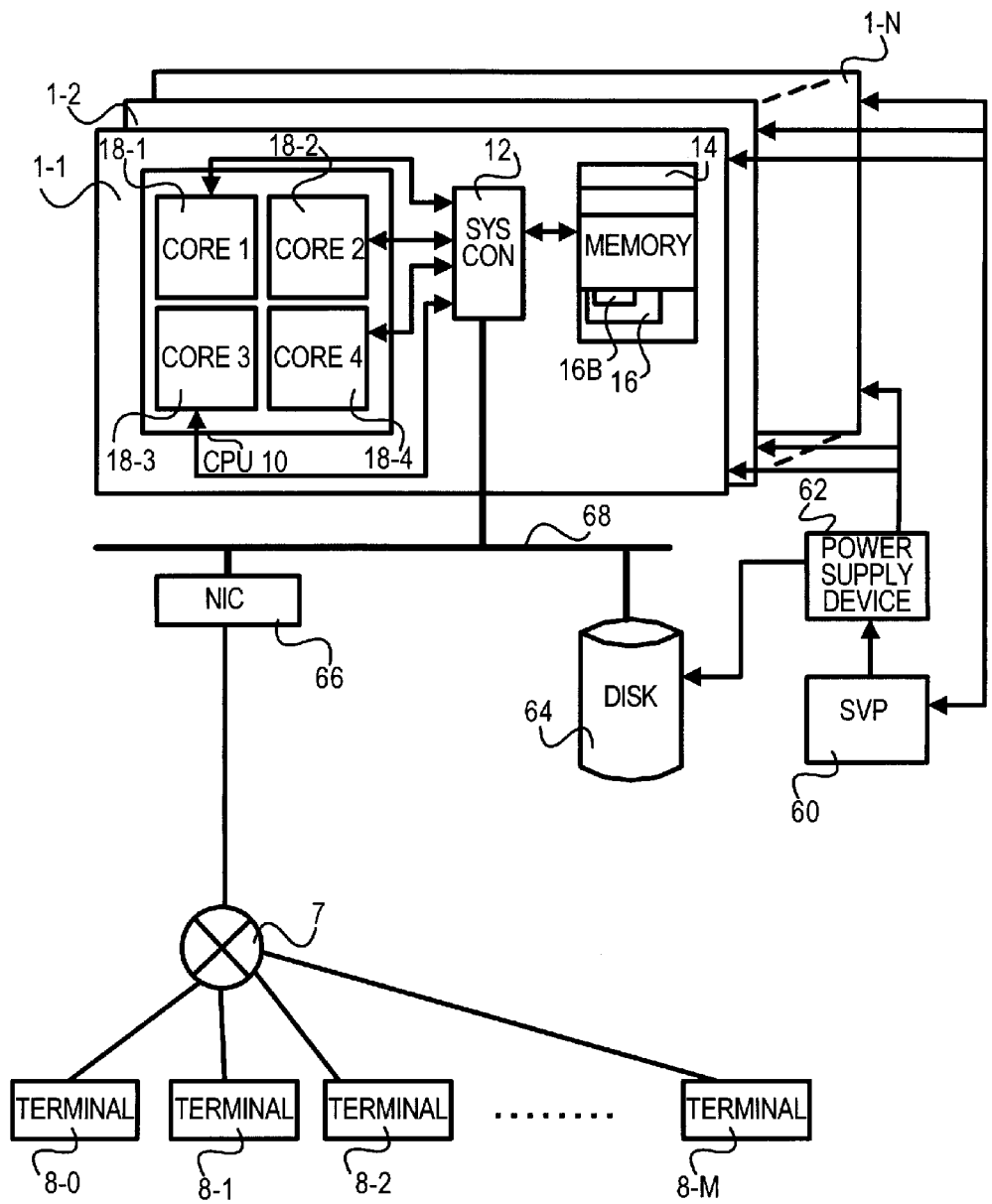
FIG. 1 Is a block diagram of an information processing system according to an embodiment.

FIG. 1 is a block diagram of an information processing system according to the embodiment. FIG. 1 illustrates an example of large computer system (computer center) in which a plurality of users use. As illustrated in FIG. 1, an information processing system includes a processing device group 1-1~1-N, a power supply device 62, a management device (described as "SVP" in FIG. 1) 60, an external storage device (described as "disk" in FIG. 1) 64, a network interface device (as described as "NIC" in FIG. 1) 66, and a connection bus 68.

The processing device group 1-1~1-N includes a plurality of processing units 1-1~1-N (referred to as a system board). Each of the plurality of system boards 1-1~1-N includes an arithmetic processing chip (CPU: Central Processing Unit) 10, a system controller (described as "SYSCON" in FIG. 1) and a main storage device (main memory) 14. The arithmetic processing chip (hereinafter referred to as CPU chip) 10 has a single or multiple CPU cores. In this example, the CPU chip 10 has four CPU cores 18-1~18-4. The number of the CPU core in the CPU chip is not limited to four, it may be adopted more than one. The CPU cores 18-1~18-4 run a program, as described in FIG. 2.

The main storage device 14 stores data etc. of the CPU cores 18-1~18-4. The system controller 12 connects to each of the CPU cores 18-1~18-4, the main storage device 14 and the bus 68, and controls data input and output form and to each of the CPU cores 18-1~18-4, the main storage device 24 and the bus 68.

The external storage device 64 is constructed of a non-volatile memory device, for example, a magnetic disk device. However, the external storage device 64 may be constructed of another non-volatile mass storage device. The external storage device 64 stores data and the like necessary for the operation of each of the system boards 1-1~1-N. The external storage device 64 is connected to the system controller 12 in each of the system boards 1-1~1-N via the connection bus 68.

The network interface device (described as NIC: Network Interface Card in FIG. 1) is connected to the system controller 12 in each of the system boards 1-1~1-N via the bus 68. In addition, the network interface device 66 is connected to a plurality of terminal devices 8-0~8-M of which the user operates via a network 7.

The management device 62 performs initialization processing including power on/off and setting of status in each of the system boards 1-1~1-N, and monitoring process of the status. The management device 62 is constructed by the service processor (SVP), for example. The power supply device 62 connects to a commercial power source, and supplies power to each of the system boards 1-1~1-N, the external storage device 64 and the network interface device 66 in response to an instruction from the management device 60.

The network 7 is constructed by a private line network or a public line network. The network 7 is available intranet and internet network. The terminal devices 8-0~8-M is constructed by a personal computer (PC), for example. The user operates the terminal devices 8-0~8-M and sends and receives data and the like to and from the system board 1-1~1-N in the information processing system through the network 7 and the network interface device 66.

The information processing system is connected to the terminal devices 8-0~8-M of each user through the network 7. The user inputs an application program name and the necessary data from the terminal devices 8-0~8-M. Items (name of the application program and data) which are inputted from the terminal device 8-0~8-M are transmitted to the system controller 12 via the network 7, the network interface device 66, and the bus 68. In addition, the terminal devices 8-0~8-M may uploads a necessary application program to the system controller 12 via the network 7, the network interface device 66, and the bus 68.

The system controller 12 instructs an execution of the application program which is specified to the CPU cores

18-1~18-4. The CPU core which is specified, runs the application program which is specified. The application program is stored in the external storage device 64, for example.

The CPU cores 18-1~18-4 in the system boards 1-1~1-N run the application program specified by the user, then the CPU cores 18-1~18-N send result of running to the terminal devices 8-0~8-M via the system controller 12, the connection bus 68, the network interface device 66, and the network 7.

In addition, the CPU cores 18-1~18-4 calculates the usage of the information processing system which executed the application program, and charges to the user. In the embodiment, the usage of the information processing system by the user is calculated depending on the processing time of the CPU chip and the power usage (power consumption). For the calculation of the power consumption, the count value in the performance counter, that the CPU cores 18-1~18-4 has, is used. In addition, usage area 16 is provided in the main storage device 14. The usage area 16 stores the power consumption per unit time of the event and billing information.

Figure 2:
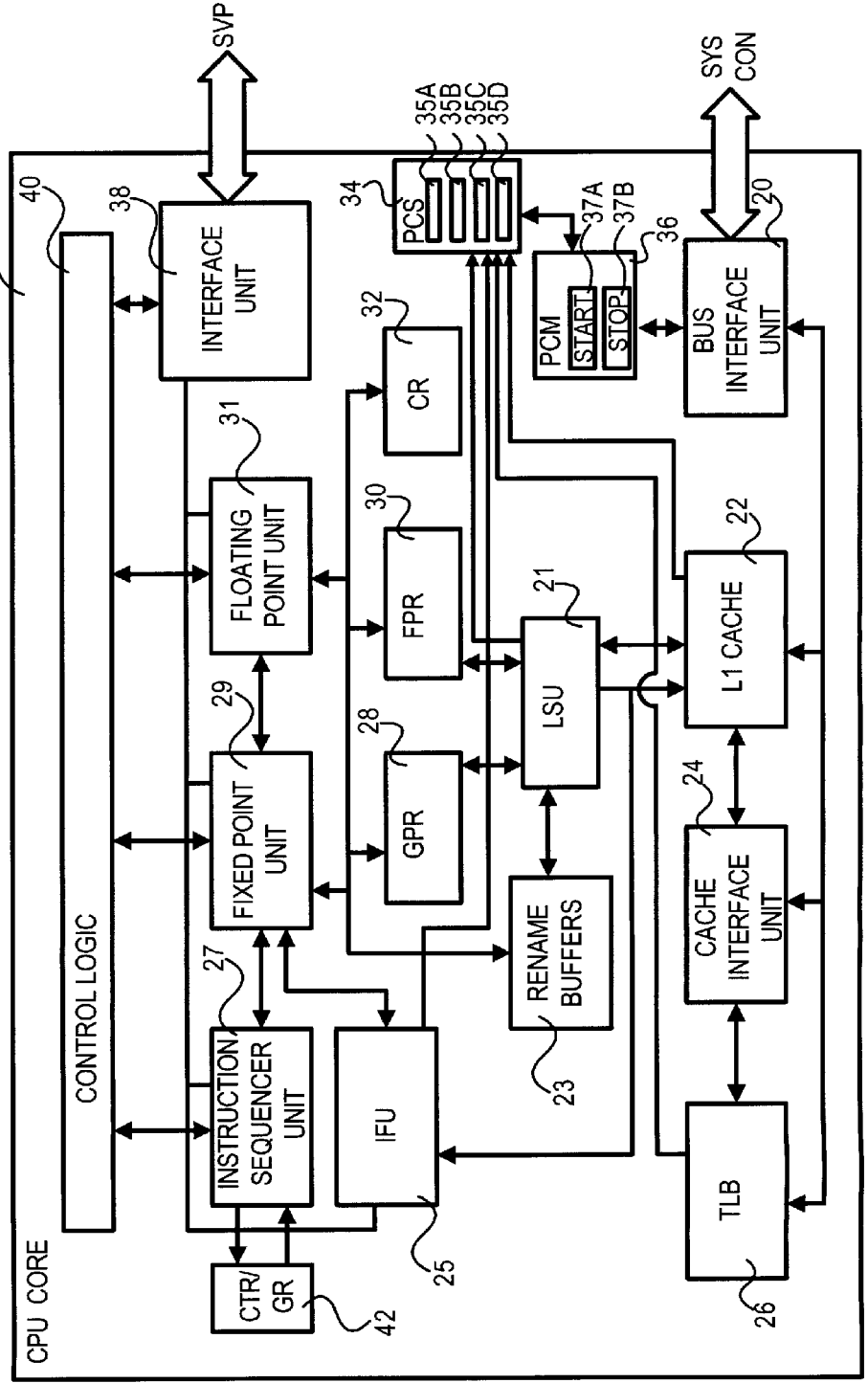
FIG. 2 is a block diagram of a CPU core in FIG. 1.

FIG. 2 is a block diagram of the CPU core 18-1 (18-2 to 18-4) in FIG. 1. As depicted by FIG. 2, the CPU core 18-1 (18-2 to 18-4) includes an arithmetic unit, a cache unit, a load/store/fetch unit and an interface unit. The interface unit includes a first interface unit 38 which communicates with the service processor (hereinafter referred to as SVP) 60 and a bus interface unit 20 to communicate with the system controller (SYSCON) 12.

The cache unit includes a first level cache (L1 cache) 22 to hold data and program instructions, a cache interface circuit 24 and a TLB (Translation Lookaside Buffer) 26 to perform conversion of virtual address and physical address. The bus interface unit 20 connects the first level cache 22, the cache interface circuit 24 and the TLB 26 to the system controller 12.

The arithmetic unit includes a fixed point unit (referred as FXU) 29 to perform integer arithmetic, a floating point unit (referred as FPU) 31 to perform floating-point arithmetic, an instruction sequencer unit (ISU) 27, and a control logic circuit 40.

The FXU29 and the FPU31 connect to resources such as a general-purpose register (GPR) 28, a floating point register (FPR) 30, a condition register (CR) 32, and a renaming register 23.

The load/store/fetch unit includes an instruction fetch unit (IFU) 25 to pre-fetch instructions from the first level cache 22 and a load/store unit (LSU) 21 to load and store the data from the first level cache 22 to the GPR 28, the FRP 30 and the renaming register 23.

The instruction sequencer unit (ISU) 27 refers to a count/link register (CTR) and a completion register (GR), and controls the sequence of instructions provided to the internal circuitry of such the FXU29 and the FPU31 from the IFU 25. The FXU29 and the FPU31 use the GPR28, the FRP30, the CR32, and the renaming register 23, and execute the instruction.

The CPU core 18-1 (18-2 to 18-4) has a performance counter 34. The performance counter 34 counts the number of events during program execution. In the embodiment, the performance counter 34 includes a INT counter 35A which counts the number of events of the integer arithmetic (INT_INS), a FP counter 35B for counting the number of event of a floating-point operation (FP_INS), a L1 counter 35C for counting the number of events of L1 cache misses (L1_TCM), and a TLB counter 35D to count the number of event of TLB misses (TLB_TL).

The INT counter 35A counts the integer arithmetic instructions from the IFU 25 as an event. The FP counter 35B counts the load and store instructions from the LSU21 as an event. The L1 counter 35C counts the L1 cache miss from the L1 cache 22 as an event. The TLB counter 35D counts the TLB miss from the TLB unit 26 as an event.

The L1 cache miss indicates that the instruction and the data specified do not hold in a memory of the L1 cache 22, when the specified instruction and data are read from the L1 cache 22. In this case, the cache interface circuit 24 reads the necessary instruction and data from the main storage device 14 via the bus interface unit 20 and stores these into the first level cache 22.

Further, the TLB miss indicates that the conversion data between the virtual address and physical address does not exist in the table when the TLB 26 performs the conversion of the virtual address and the physical address using the table. In this case, the cache interface circuit 24 reads the conversion data to be required from the main memory device 14 via the bus interface unit 20, and stores these in the table in the TLB26.

In addition, the CPU core 18-1 (18-2 to 18-4) has a performance counter management unit 36. The performance counter management unit 36 has registers 37A and 37B to instruct a start and end of the performance counter 34 and to set the event in which the performance counter 34 acquires.

In the embodiment, in order to calculate the power consumption, the performance counter 34 is utilized. And among the events that the performance counter 34 monitors, only the events closely related to the power consumption of the CPU are measured. In the embodiment, the events used for measure the power consumption include arithmetic operations of the integer and floating-point arithmetic, the cache miss, and the TLB miss. The arithmetic operations on floating-point operations and integer arithmetic are closely related to the power consumption. Further, since the operation, which reads necessary instruction and data from the main storage device 14 and stores in the first level cache, is necessary for the cache miss, it is closely related to the power consumption. Furthermore, in the case of the TLB miss, because the operation of reading a conversion table in page units from the main storage device 14 and storing in the TLB 26, is necessary, it is closely related to the power consumption.

Therefore, in the embodiment, the analysis of power consumption of the program utilize the number of events in the integer arithmetic, the floating point operation, the cache miss and the TLB miss among the observation events in the performance counter 34.

First Embodiment of the Analysis of Power Usage Amount

Figure 3:
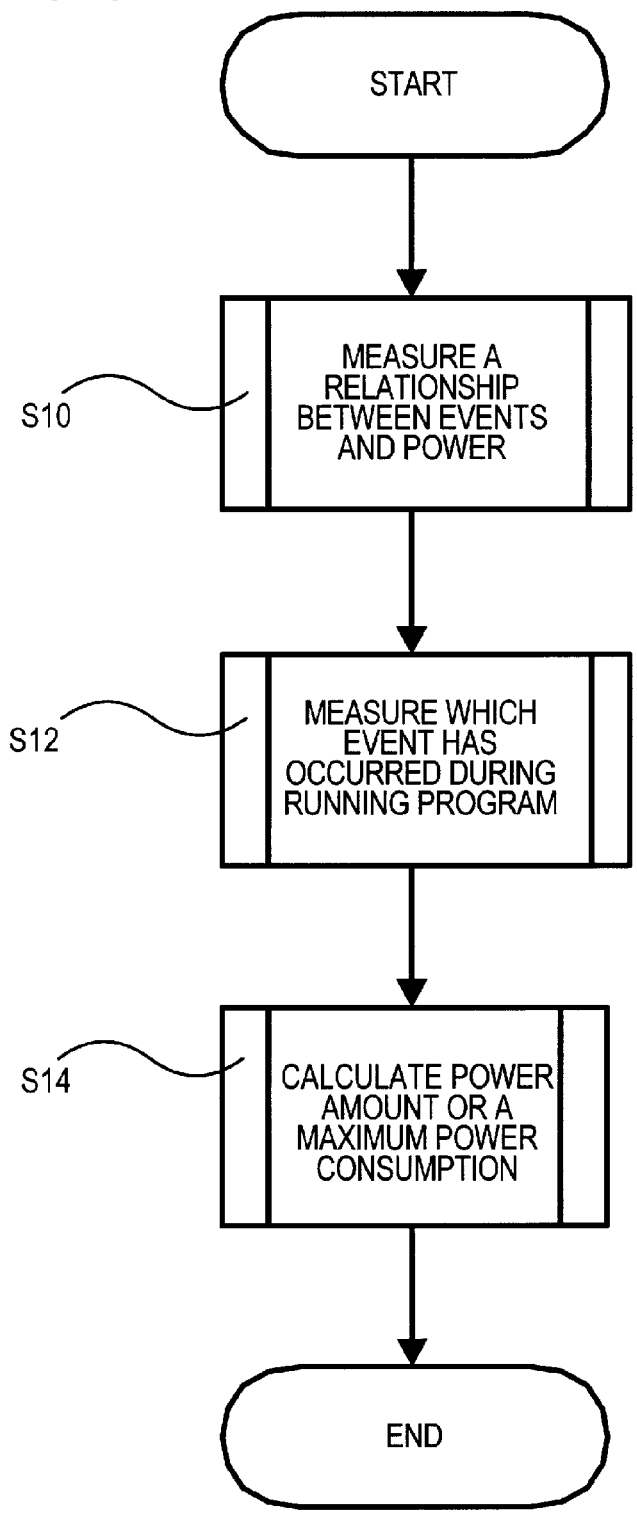
FIG. 3 is a process flow diagram of power consumption according to an embodiment.

FIG. 3 is a process flow diagram of power usage according to an embodiment.

(S10) As described below by using FIG. 4 to FIG. 6, prior to program execution, when the event has occurred in the CPU core 18-1 (18-2~18-4), power values is measured, then the relationship between the power consumption and the event is examined and stored in the usage area of the main memory device 14.

(S12) Then the CPU core 18-1 (18-2 to 18-4) runs the program. As will be described in FIG. 7 to FIG. 12, the CPU core 18-1 (18-2 to 18-4) measures the number of the occurrence of the event in the performance counter 34 during running of the program and after a completion of running the program.

(S14) As will be described later by using FIG. 13, after the execution of the program, the power amount or the maximum power of the program is calculated from the relationship between the number of the event occurrence and the power consumption of the event.

Next, the measurement process of the relationship between the event and the power consumption in the step S10 will be described. That is, the relationship between the event and the power consumption is measured in advance prior to the execution of the program. The following describes the method of measurement.

Figure 4:
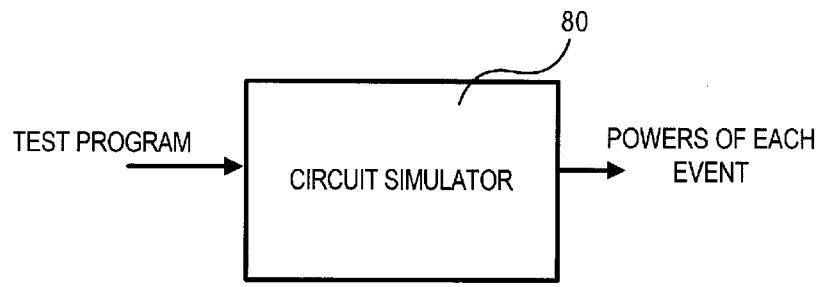
FIG. 4 is an explanatory diagram of measurement processing a relationship between events and power consumption in FIG. 3 according to a first embodiment.

FIG. 4 is an explanatory diagram of the measurement processing of the relationship between the event and the power consumption according to a first embodiment. As depicted by FIG. 4, using a circuit simulator 80, the power consumption for the number of occurrences of events per unit time are respectively calculated for each event. The circuit simulator 80 is an information processing device to execute the circuit simulation program.

First, in advance, a test program for generating each event (integer arithmetic, a floating-point arithmetic, L1 cache miss and a TLB miss, etc.) is created. For example, a program to execute the integer arithmetic, a program to execute a floating-point arithmetic, a program causing the L1 cache miss, and a program that cause the TLB misses, are prepared.

The circuit simulator 80 runs the test program that was created, and measures the number of occurrences of each event from the performance counter of the information processing device that executes the circuit simulation. Then, the circuit simulator 80 calculates the power consumption of each event from the observed value of the performance counter.

A software simulator and a hardware simulator are known as the circuit simulator. The software simulator is a software program that simulates the operation of the circuit. The software simulator is classified into an analog circuit simulator and a digital circuit simulator.

The analog circuit simulator, by entering design of the analog circuit, simulates the behavior of the analog circuit which is inputted, and calculates the power (voltage and current). For example, a known SPICE (Simulation Program with Integrated Circuit Emphasis) can be used.

In addition, the digital circuit simulator, by entering the design of the digital circuit (RTL (Register Transfer Level) and gate level), simulates the behavior of the digital circuit. The digital circuit simulator is not able to directly determine the power value of each circuit, but is able to determine operation ratio of each element in the circuit. For example, VCS (registered trademark) delivered by Synopsys incorporation may be available.

In the embodiment, the analog circuit simulator measures the power of each element in the CPU core. Also, the digital circuit simulator runs the test program and measures the operation rates of each element and the power consumption of the entire. And the relationship between the events and power consumptions are calculated from the operation rate and the power consumption of each circuit elements which were measured by the digital circuit simulator and the power consumption of each circuit element which were measured by the analog circuit simulator.

On the other hand, the hardware simulator (also called emulator) is a system consisting of dedicated hardware and software to simulate the operation of digital circuits. The hardware simulator expands the circuit information on the hardware and simulates the operation of the circuit. As the power value, it is possible to calculate the power of the entire circuit in the same manner as the above-described digital circuit simulator. For example, a Palladium (registered trademark) delivered by Cadence incorporation is available.

A method of using these simulators is able to measured the power consumption without the use of an information processing system to run the program which is measured the power consumption. In other words, it is possible to measure the power consumption in software.

Figure 5:
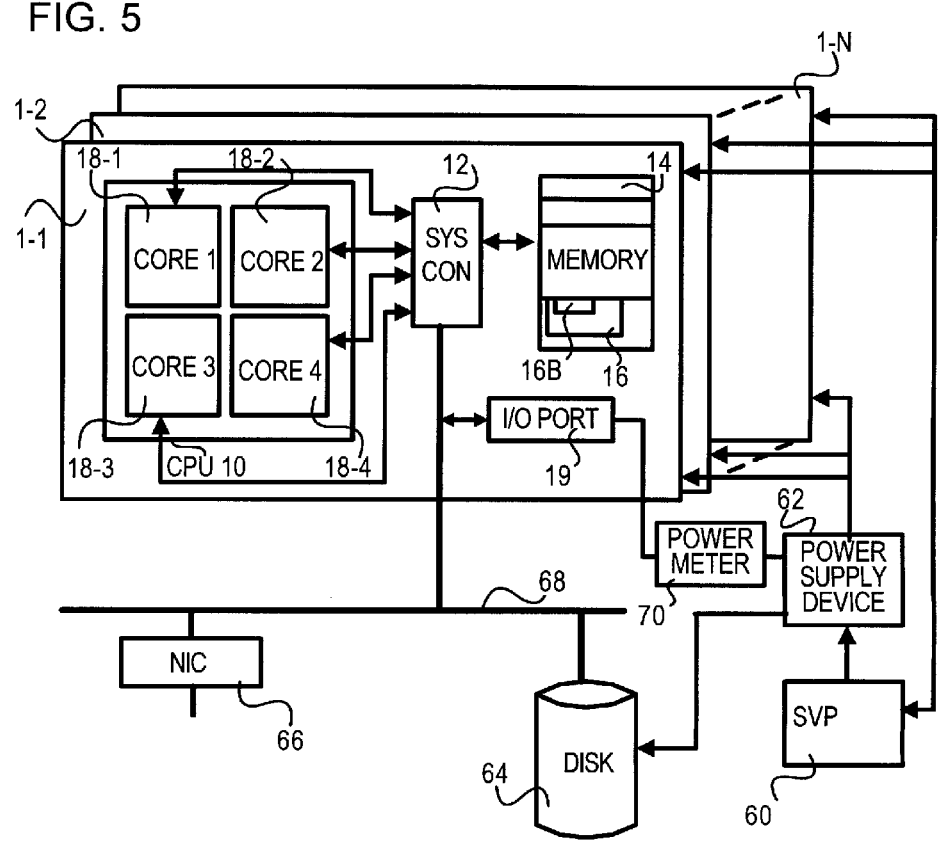
FIG. 5 is an explanatory diagram of measurement processing a relationship between events and power consumption in FIG. 3 according to a second embodiment.

FIG. 5 is an explanatory diagram of the measurement processing of the relationship between the event and the power consumption according to a second embodiment. In FIG. 5, same elements as described in FIG. 1 and FIG. 2 are indicated by the same symbols. As depicted by FIG. 5, the information processing system in FIG. 1 measures the power consumption of each event. That is, in the configuration of the information processing system in FIG. 1, an electric power meter 70 is provided to measure the electric power (Wh) of the power supply device 62. Further, a I/O port 19 is provided to connect the electric power meter 70 to the bus 68. The CPU cores 18-1~18-4 in the CPU chip 10 imports the amount of power in the electric power meter from the I/O port 19.

Next, each test program for generating each events is prepared as well as the measurement process of the power consumption due to the simulator described above, in advance. The information processing system runs each of the test programs. The information processing system, after the end of execution of each test program, measures the number of occurrences of the corresponding event from the performance counter 34 and imposes the amount of power from the power meter 70.

Figures 6, 7:
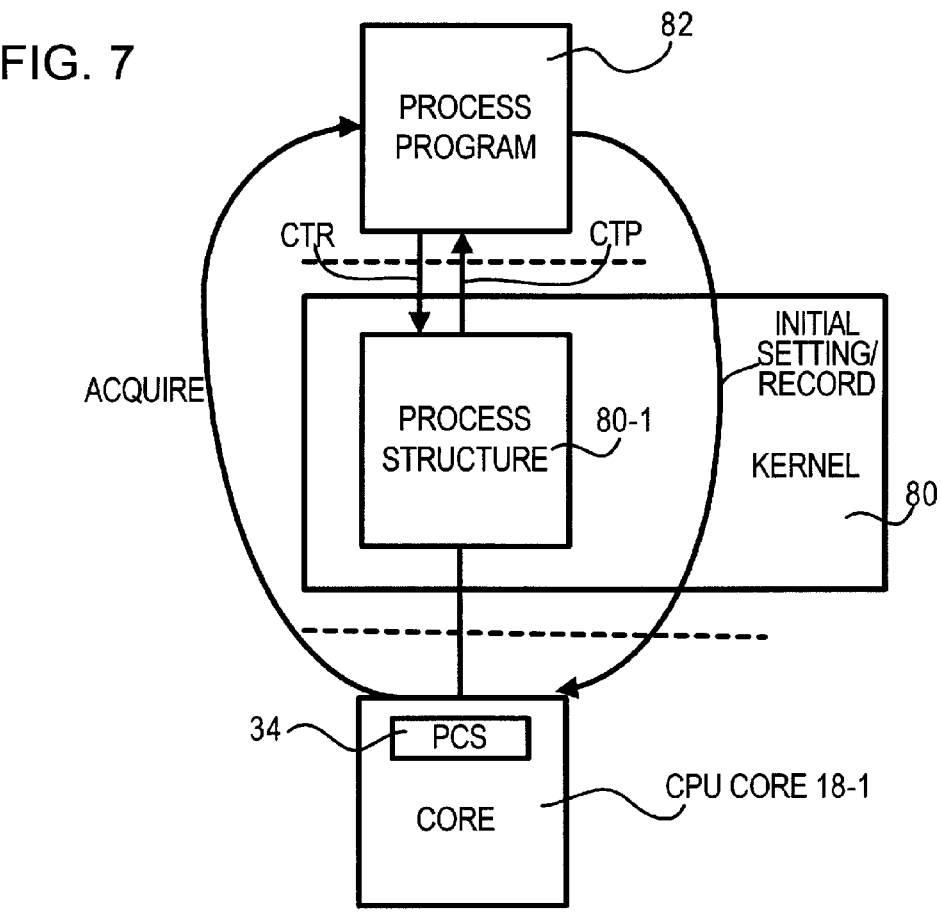
FIG. 6 is an explanatory diagram of results of measurement processing of a relationship between the events and the powers in FIG. 3.
FIG. 7 is a block diagram for measuring the number of occurrences of the events in FIG. 3 according to a first embodiment.

FIG. 6 is a diagram indicating a relationship between each event and the power consumption per unit time which was measured. FIG. 6 indicates a relationship the power amount (power consumption) and each events when the simulator in FIG. 4 or the configuration in FIG. 5 executed the program to perform the integer arithmetic, the program for performing floating-point operations, the program causing the L1 cache miss and the program causing a TLB miss. In the embodiment, the explanation below will be described as all events is completed in one unit time.

That is, in the measurement result of the power consumption depicted by FIG. 6, the power for single integer arithmetic (INT_INS) is consumed 100 mW, and the power for single floating-point arithmetic (FP_INS) is consumed 200 mW. Also, in the measurement result of the power consumption depicted by FIG. 6, the power for single L1 cache miss (L1_TCM) is consumed 300 mW, and the power for single TLB miss (TLB_TL) is consumed 400 mW. The measurement results of the power consumption of each event in FIG. 6 are stored in event power consumption storage area 16A of the usage storage area 16 in the main storage device 14.

Calculation of Power Usage Amount

Then, a process of measuring the number of occurrences of events for power analysis when the program is running in step S12 of FIG. 3 is explained. FIG. 7 is an explanatory diagram of the process for measuring the number of events during program execution according to a first embodiment. FIG. 8 is a diagram of a time chart of a first measurement process according to the first embodiment in FIG. 7. FIG. 9 is a diagram illustrating the measurement results of the number of the events according to the processing in FIG. 8.

In FIG. 7, same elements as those depicted in FIG. 1 and FIG. 2, are indicated by same symbols. As depicted by FIG. 7, the CPU core 18-1 executes a process program (application program) 82 under a control of kernel 80 of OS (Operating System). The kernel 82 has data called as process structure 80-1 for each program 82.

The process structure 80-1 holds information (an identifier ID, status of the process itself, information of memory, file and the CPU core, account information, etc.) of the process program 80-1 which is executing. After the kernel 80 transfers a control right to the process program 82 (indicated as "CTR" in FIG. 7), the CPU core 18-1 starts the execution of the process program 82. And when the process program 82 completed the process, the process program returns the control right to the kernel 80 (indicated as "CTP" in FIG. 7).

In FIG. 7 and FIG. 8, the process program 82 itself observes the performance counter 34 at the end of the process in the program 82. First, at the beginning of the process program 82, the process program 82 performs the initial settings of the performance counter 34, and starts to measure the performance counter 34. In the example in FIG. 2, the process program 82 set a start to the start register 37A of the performance counter management unit 36, thereby the number of the events counter 35A~35D which are specified in the performance counter 34 start to count. And, the process program 82 sets the start to the start register 37A in the performance counter management unit 36, the process program 82 may store the count value of the number of events counter 35A~35D which are specified.

And, at the end of the process program 82, the process program 82 observes the value of the performance counter 34, and records the value. In the embodiment in FIG. 2, the process program 82 instructs a stop to the stop register 37B of the performance counter management unit 36, thereby the number of events counters 35A~35D which are specified in the performance counter 34 stop to count. Then, the process program 82 reads out the count value of the number of event counters 35A~35D for each event, and the process program 82 records the values in the number of event storage 16B of the usage amount storage area 16 in the main storage device 14.

In addition, the process program 82 instructs a stop to the stop register 37B of the performance counter management unit 36, and stores the count values of the number of event counters 35A~35D which are specified in the performance counter 34. Then, the process program 82 calculates a difference between the count value stored at the initialization and stored count value when instructing the stop, and may records the difference in the number of event storage 16B of the usage amount storage area 16 in the main storage device 14.

For example, FIG. 9 illustrates example values of the measurement result of the number of the events when the process program 82 was executed. That is, the measurement results indicate that the number of the integer arithmetic (INT_INS) is "6", the number of the floating-point arithmetic (FP_INS) is "3", the number of the L1 cache miss (L1_TCM) is "1", and the number of the TLB miss (TLB_TL) is "1". The measurement results of the number of events as depicted by FIG. 9 are stored 16B in the number of event storage 16B of the usage amount storage area 16 in the main storage device 14.

Figures 11, 12:
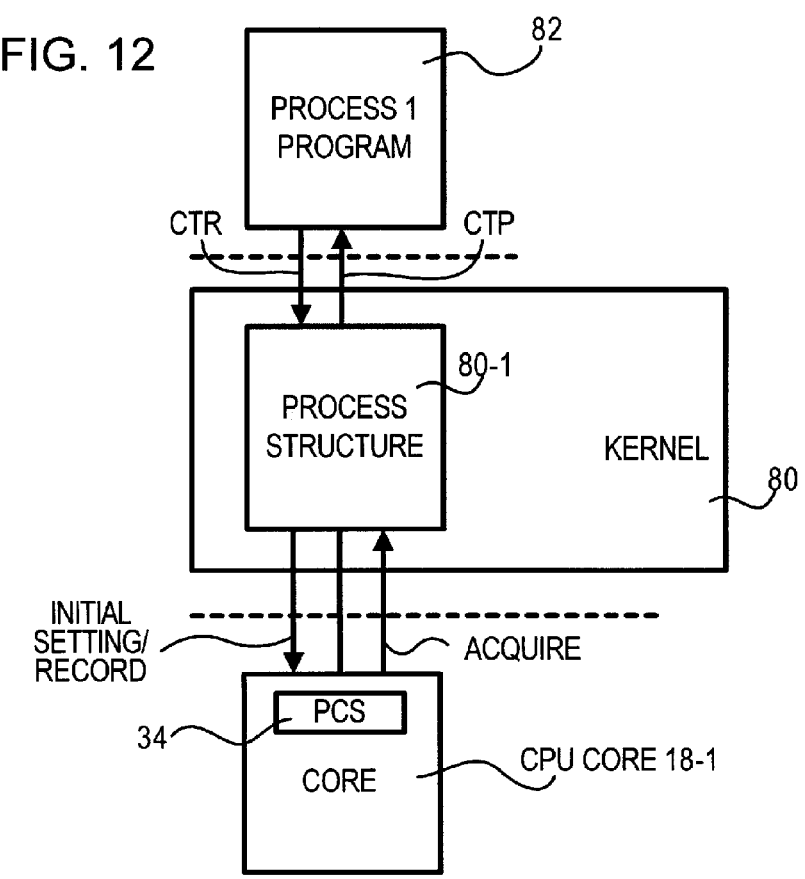
FIG. 11 is an explanatory diagram of the processing results of the measurement of the number of occurrences of the events.
FIG. 12 is an explanatory diagram of the measurement processing of the number of occurrences of the events in FIG. 3 according to a third embodiment.

FIG. 10 is a diagram of a timing chart of a second measurement process according to the first embodiment in FIG. 7. FIG. 11 is a diagram illustrating the measurement results of the number of events by processing of FIG. 10. FIG. 10 represents a processing that the process program 82 itself observes the performance counter 34 at a predetermined interval.

As represented by FIG. 10, at the beginning of the process program 82, the process program 82 performs the initial setting of the performance counter 34, and starts the measurement of the performance counter 34. In the embodiment in FIG. 2, the process program 82 sets the start to the start register 37A in the performance counter management unit 36, thereby the number of event counters 35A~35D which are specified in the performance counter 34 starts to count.

The process program 82 observes the count values of the performance counter 34 at a predetermined interval, and records the count values. For example, the process program 82 sets a stop (indicated by "ST" in FIG. 10) to the stop register 37B of the performance counter management unit 36 according to an interrupt by a timer, thereby stopping the count of the number of event counters 35A~35D which are specified in the performance counter 34.

Then, the process program 82 reads out the count value of the number of event counters 35A~35D for each event (depicted as "CP" in FIG. 10), and records the values in the number of event storage 16B of the usage amount storage area 16 in the main storage device 14. In addition, the process program 82 sets a re-start to the start register 37A in the performance counter management unit 36 (depicted by "R" in FIG. 10), thereby the number of event counters 35A~35D which are specified in the performance counter 34 re-starts to count.

And, at the end of the process program 82, the process program 82 observes the value of the performance counter 34, and records the value. In the embodiment in FIG. 2, the process program 82 instructs a stop to the stop register 37B of the performance counter management unit 36, thereby the number of events counters 35A~35D which are specified in the performance counter 34 stop to count. Then, the process program 82 reads out the count value of the number of event counters 35A~35D for each event (depicted by "CP" in FIG. 10), and the process program 82 records the values in the number of event storage 16B of the usage amount storage area 16 in the main storage device 14.

For example, FIG. 11 represents an example of measurement results of the number of the events at the predetermined interval. In FIG. 11, by the execution of the process program 82, the number of the integer arithmetic (INT_INS), the number of the floating-point arithmetic (FP_INS), the number of the L1 cache miss (L1_TCM), and the number of the TLB miss (TLB_TL) are measured and recorded at every periodic measurement times 1-9. The measurement results of the number of each event at each measurement time in FIG. 11 are stored the number of event storage 16B of the usage amount storage area 16 in the main storage device 14.

In the measurement process of the number of events by the process program, the process program may be modified or may be linked to a special runtime. That is, there is no need to modify the kernel. Further, in the measurement process in FIG. 8, a performance degradation can be small. In addition, in the measurement process in FIG. 11, it is possible to determine the maximum power consumption.

FIG. 12 is an explanatory diagram of the measurement process of the number of events during program execution according to a second embodiment. In FIG. 12, the same elements as those described in FIG. 1, FIG. 2 and FIG. 7 are indicated by same symbols. As depicted by FIG. 12, the CPU core 18-1 executes the process program (application program) 82 under the control of the kernel 80 of the OS (Operating System). The kernel 82 has data called as the process structure 80-1 for each program 82.

The process structure 80-1 holds information (an identifier ID, status of the process itself, information of memory, file and the CPU core, account information, etc.) of the process program 80-1 which is executing. After the kernel 80 transfers a control right to the process program 82 (indicated as "CTR" in FIG. 12), the CPU core 18-1 starts the execution of the process program 82. And when the process program 82 completed the process, the process program 82 returns the control right to the kernel 80 (indicated as "CTP" in FIG. 12).

In FIG. 12, a program that runs in the background other than the process program 82 performs the measurement process of the number of events. In the embodiment, the kernel 80 performs the measurement of the number of events. The kernel 80, immediately before transferring the control right to the process program 82 (indicted as "CTR" in FIG. 12), performs the initial setting of the performance counter 34, thereby the performance counter 34 starts to measure. In the embodiment in FIG. 2, the kernel 80 sets the start to the start register 37A in the performance counter management unit 36, thereby the number of event counters 35A~35D which are specified in the performance counter 34 start to count.

And after the execution of the process program 82 is completed and the process program 82 returns the control right to the kernel 80 (depicted as "CTP" in FIG. 12), the kernel 80 observes the value of the performance counter 34, and records the value. In the embodiment in FIG. 2, the kernel 80 instructs a stop to the stop register 37B of the performance counter management unit 36, thereby the number of events counters 35A~35D which are specified in the performance counter 34 stop to count. Then, the kernel 80 reads out the count value of the number of event counters 35A~35D for each event and records the values in the number of event storage 16B of the usage amount storage area 16 in the main storage device 14. For example, the measurement results of the number of the events in the embodiment are same as that depicted by FIG. 9, and an explanation of the measurement results of the number of the event will be omitted.

Further, in another embodiment of the measurement processing by the kernel 80 depicted in FIG. 12, the kernel 80 performs a process to observe the performance counter 34 at a predetermined interval as same as FIG. 10. That is, The kernel 80, immediately before transferring the control right to the process program 82 (indicted as "CTR" in FIG. 12), performs the initial setting of the performance counter 34, thereby the performance counter 34 starts to measure. In the embodiment in FIG. 2, the kernel 80 sets the start to the start register 37A in the performance counter management unit 36, thereby the number of event counters 35A~35D which are specified in the performance counter 34 start to count.

The kernel 80 observes the count values of the performance counter 34 at a predetermined interval, and records the count values. For example, the kernel 80 sets a stop to the stop register 37B of the performance counter management unit 36 according to an interrupt by a timer, thereby stopping the count of the number of event counters 35A~35D which are specified in the performance counter 34.

Then, the kernel 80 reads out the count value of the number of event counters 35A~35D for each event and records the values in the number of event storage 16B of the usage amount storage area 16 in the main storage device 14. In addition, the kernel 80 sets a re-start to the start register 37A in the performance counter management unit 36, thereby the number of event counters 35A~35D which are specified in the performance counter 34 re-starts to count.

And after the execution of the process program 82 is completed and the process program 82 returns the control right to the kernel 80 (depicted as "CTP" in FIG. 12), the kernel 80 observes the value of the performance counter 34, and records the value. In the embodiment in FIG. 2, the kernel 80 instructs a stop to the stop register 37B of the performance counter management unit 36, thereby the number of events counters 35A~35D which are specified in the performance counter 34 stop to count. Then, the kernel 80 reads out the count value of the number of event counters 35A~35D for each event and records the values in the number of event storage 16B of the usage amount storage area 16 in the main storage device 14.

For example, the measurement results of the number of the events at the predetermined interval in the embodiment are same as that depicted by FIG. 11, and an explanation of the measurement results of the number of the event will be omitted. When the kernel 80 performs the measurement process, it is possible to prevent deterioration of performance of the execution of the process program 82.

Further, during the process of observing the performance counter 34 and recording, the performance counter 34 continues to operate. At this rate, there is a possibility that the power consumption associated with the processing of performance counters become to a target of the charge. Therefore, the increased power consumption for continuing the operation is excluded from the measurement value of the counter.

When the process program 82 performs the measurement processing as depicted by FIG. 8, because the process program 82 starts the measurement by the counter 34 after completing the initial setting process of the performance counter 34 and measures and records the count value in the counter 34 after the counter 34 is stopped at the end of the process program 82, the increase power consumption is not included in the measurements.

When the process program 82 performs the measurement processing at the predetermined interval as depicted by FIG. 10, because the process program 82 performs a process (depicted as ST in FIG. 10) to stop the counter 34 and a process (depicted as R in FIG. 10) to re-start the counter 34 before and after a process (depicted as CP in FIG. 10) for measuring and recording the value of the counter 34 periodically as described by FIG. 10, it is possible to eliminate the increase power consumption from the measured value.

When the kernel 80 performs the measurement process as depicted by FIG. 12, the kernel 80 saves and restores the value of the performance counter 34 simultaneously when changing the process program 82.

Next, the process of analyzing the power amount after the completion of execution of the program in step S14 of FIG. 3 will be explained. First, in a case of the result of the measurement process in the beginning and end of the program described in FIG. 8, the power amount is calculated by multiplying the number of times for each event and the power consumption of each event from the power consumption of single number of each event described in FIG. 6 and the number of times for each event of the program that was measured in FIG. 9 and adding the multiplied results of each event. For example, in an example values of the power consumption of single number of each event depicted by FIG. 6 and the number of measured events of the program represented by FIG. 9, the power amount of the program are calculated as follows.

The power amount=$0.1 \times 6 + 0.2 \times 6 + 0.3 \times 1 + 0.4 \times 1 = 1.9$ Wh.

Then, in a case of the result of the measurement process in the beginning and end of the program and at the predetermined interval described in FIG. 10, the total power amount and the power consumption per time are calculated from the power consumption of single number of each event described in FIG. 6 and the number of times for each event of the program that was measured in FIG. 11.

The total power amount is calculated by multiplying the number of times for each event and the power consumption of each event and adding the multiplied results of each event. For example, in a case of values of the power consumption of single number of each event depicted by FIG. 6 and the number of measured events of the program represented by FIG. 11, the total power amount of the program is calculated as follows.

Total power amount=0.1×6+0.2×6+0.3×1+0.4×1=1.9 W.

Further, the power consumptions at each time are calculated. FIG. 13 is a diagram illustrating a table stored the results of calculating the power consumption at each time. That is, the power consumptions of each time are calculated by multiplying the number of times for each event and the power consumption of events that have occurred in each time depicted by FIG. 11. For example, in the example value in FIG. 11, since the integer arithmetic event (INT_INS) occurs once at a time No. 1, the power consumption at the time No. 1 is calculated as 0.1×1=0.1 W. Also, in the time No. 2, the floating-point arithmetic event (FP_INS) occurs once, the L1 cache miss event (L1_TCM) occurs once, and the TLB miss event (TLB_TL) occurs once. Therefore, the power consumption of the time No. 2 is calculated as follows.

The power consumption at the time No. 2=0.2×1+0.3×1+0.4×1=0.9 W.

Figure 13:
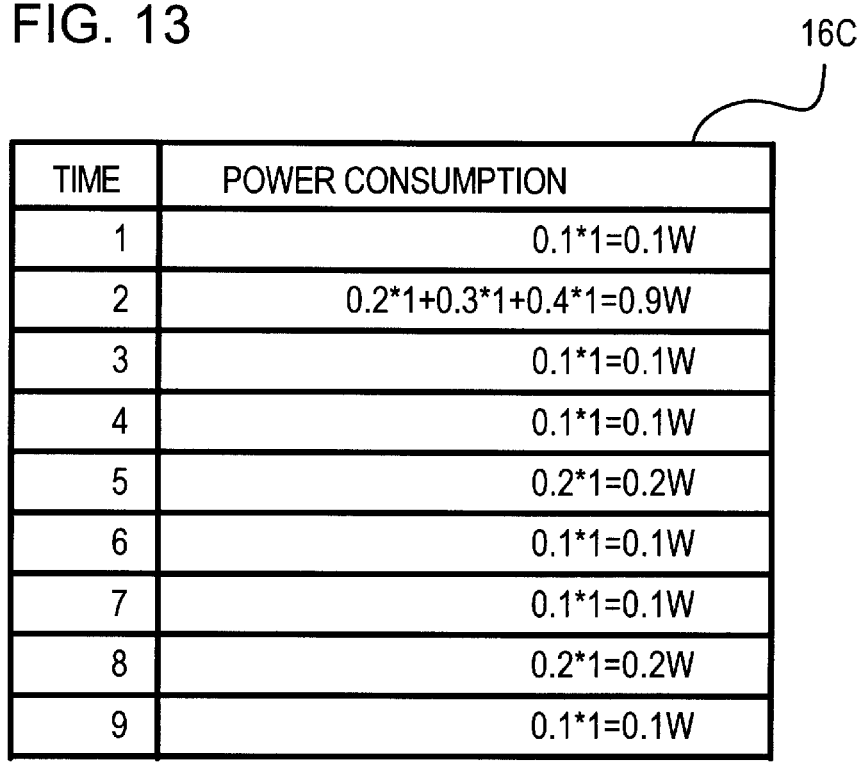
FIG. 13 is an explanatory diagram of an analyzing process of the power consumption according to an embodiment.

As depicted by FIG. 13, since the power consumptions can be calculated at each time from the start to the end of the program execution, it is possible to determine the maximum power consumption which is necessary to run the program. In the example of FIG. 13, the maximum power consumption is 0.9 W at the time No. 2.

In this way, for each execution of the program that the user specified, it is possible to determine the total power amount or the maximum power consumption which is necessary to run the program. By calculating the usage amount of the program, such as accounting amount of the large computer according to the value of the power consumption or the maximum power consumption, as described below, it is possible to become greater fairness of the account. Also, it is possible to easily set the account for the operation administrator of the large computer.

Furthermore, the incentive is caused to reduce the power consumption or the maximum power consumption by tuning the program. Therefore, it is expected to reduce in energy consumption of which the large computer uses.

Second Embodiment of the Analysis of Power Usage

Figure 14:
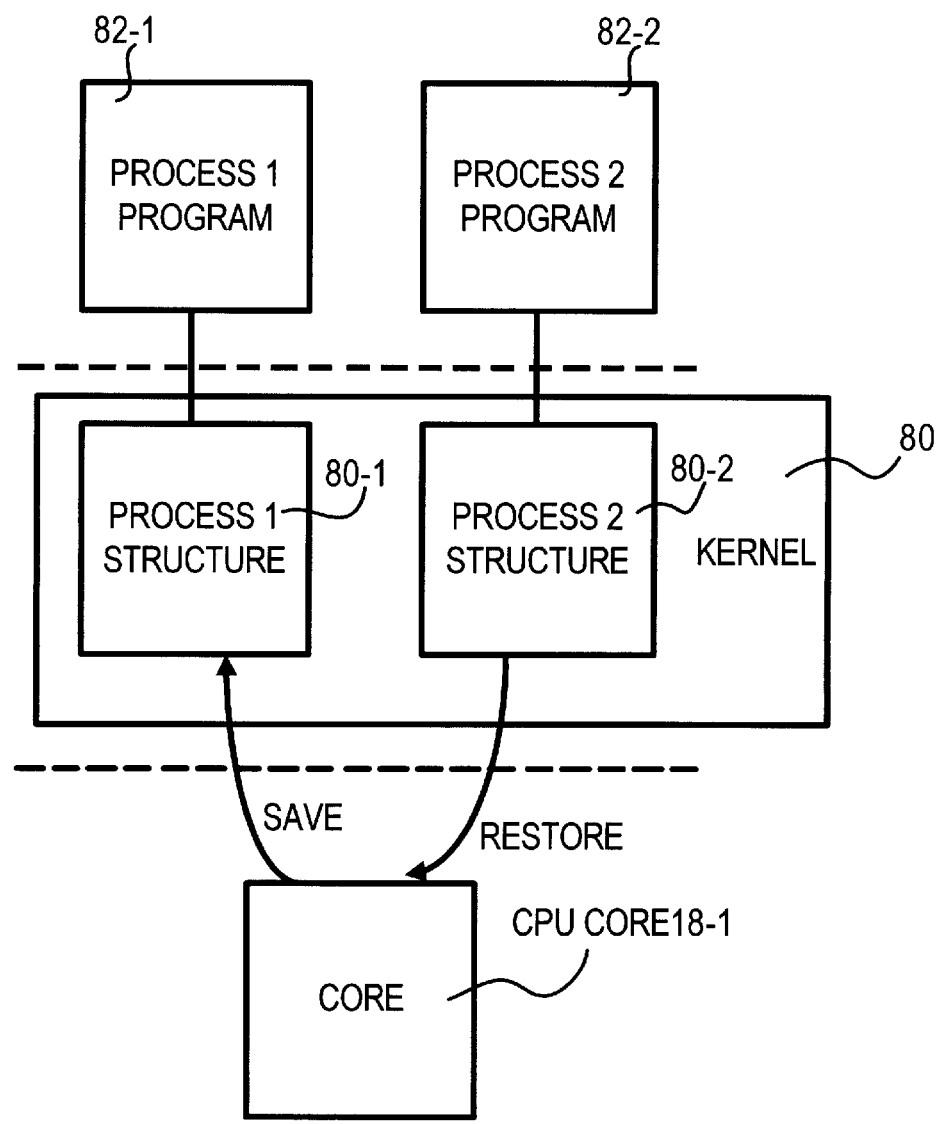
FIG. 14 is a block diagram of measuring the number of occurrences of the events in FIG. 3 according to a second embodiment.

FIG. 14 is an explanatory diagram of measuring the number of occurrences of the events according to a second embodiment. In FIG. 14, same elements as those described in FIG. 1, FIG. 2 and FIG. 7 are indicated by same symbols. FIG. 14 represents that the power consumption analysis in the embodiment is applied to a multi-process.

As depicted by FIG. 14, a multi-process executes single process while switching the process when a single CPU core 18-1 run a plurality of the processes 82-1 and 82-2. The multi-process can look like running the plurality of processes at the same time. The CPU core 18-1 runs the process program (application program) 82-1 and 82-1 under the control of the kernel 80 as the OS (Operating System). The kernel 80 has data structure called as the process structure 80-1 and 80-2 for each of the process programs 82-1 and 82-2.

The process structures 80-1 and 80-2 hold information (an identifier ID, status of the process itself, information of memory, file and the CPU core, account information, etc.) of the process program which is executing. After the kernel 80 transfers the control right to the process programs 82-1 and 82-2, the CPU core 18-1 starts the execution of the process programs 82-1 and 82-2. And when the process programs 82-1 and 82-2 completed the process, the process programs return the control right to the kernel 80. The kernel 80 performs the switching between a plurality of processes. During switching, the kernel 80 saves the state of the process to the process structures 80-1 and 80-2.

In FIG. 14, when the CPU core 18-1 switches the execution of the process (program) 82-1 to a execution of process (program) 82-2, the CPU core 18-1 saves the information in the CPU core 18-1 to the process structure 80-1 of the process 18-1 and then restores the information of the CPU core 18-1 from the process structure 80-2 of the process 18-2.

Further, in the case where the CPU chip is configured by a configuration of the multi-core which has a plurality of CPU cores, the process may be restored to a CPU core which is different from the CPU core that previously saved the process. In addition, in the case of multi-process, the program may create a child process and are executed by two or more processes or another program is executed at the same time. Further, in the CPU chip having a multi-core configuration, execution of the process may be moved to a different CPU core.

Figure 15:
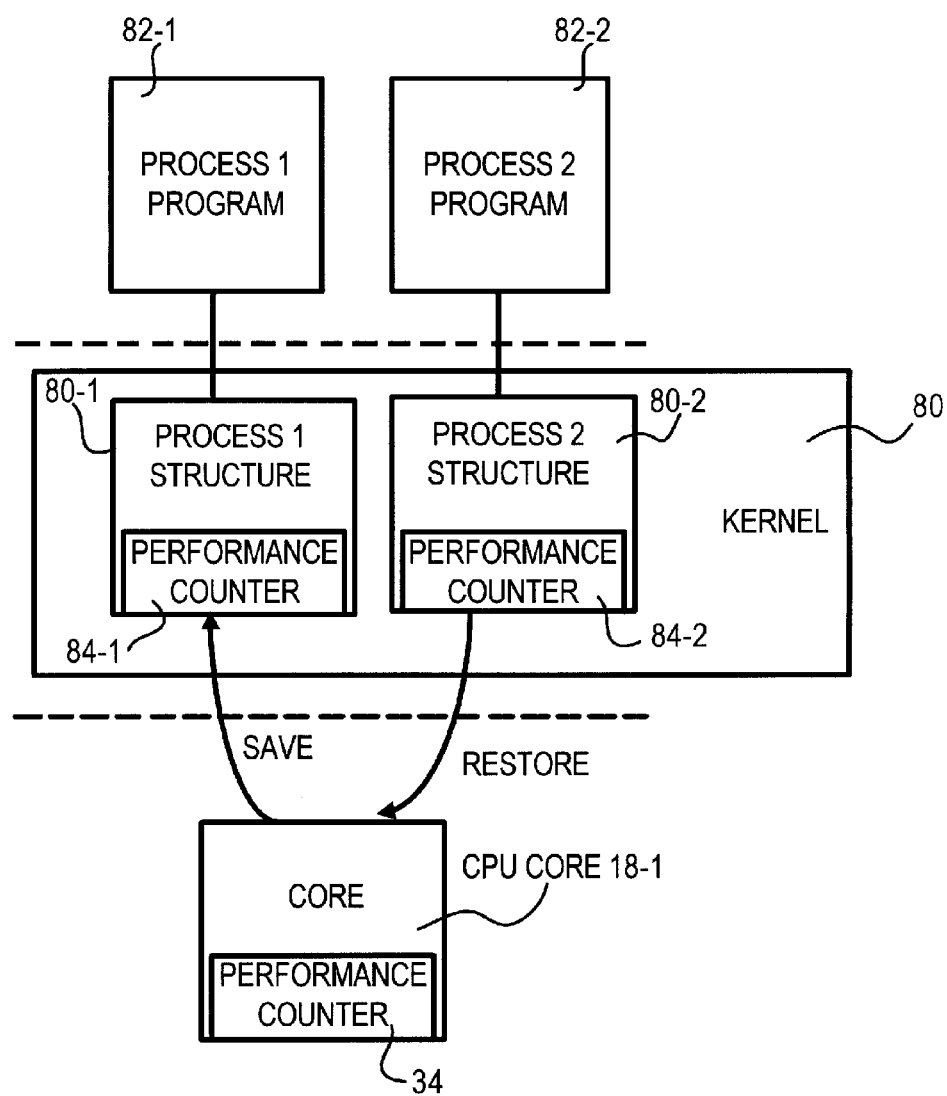
FIG. 15 is a diagram for explaining the operation in FIG. 14.

The second embodiment represents an embodiment that the analysis processing of the power consumption for each program corresponds to the multi-process. FIG. 15 is an explanatory diagram of the power consumption analysis process according to the second embodiment. In FIG. 15, same elements as that depicted by FIG. 1, FIG. 2, FIG. 7 and FIG. 14 are indicated by same symbols.

Firstly, a method to determine the relationship between the event and power consumption is the same as the first embodiment described in FIG. 4 and FIG. 5. Then, the process of measurement which the event occurred when the program is running will be described with reference to FIG. 15. A first processing method is a process that the kernel 80 o observes the performance counter 34 at the end of the process.

As represented by FIG. 15, the process structures 80-1 and 80-2 of the kernel 80 are added regions 84-1 and 84-2 for storing the value of the performance counter 34 in the CPU core 18-1. When one of the processes of the target programs 82-1 and 82-2 start running, the kernel 80 performs the initial setting of the performance counter 34 in the CPU core 18-1 and starts the measurement of the performance counter 34.

When the kernel 80 switches the process (for example, when switching from the process 82-1 to the process 82-2), the kernel 80 saves the value of the performance counter 34 in the CPU core 18-1 to the region 84-1 in the process structure 80-1 and then restores the value saved in the region 84-2 in the process structure 80-2 to the performance counter 34 in the CPU core 18-1.

In addition, when the execution of the program completed, the kernel 80 records the value of the performance counter 34 in the CPU core 18-1 to the process structure of the program in which the execution of the program completed. In the first process, the quantity of power can be calculated.

A second processing method is a process that the kernel 80 periodically observes the value of the performance counter 34 for each process. Similar to the first processing method, the process structures 80-1 and 80-2 of the kernel 80 are added regions 84-1 and 84-2 for storing the value of the performance counter 34 in the CPU core 18-1. When one of the processes of the target programs 82-1 and 82-2 start running, the kernel 80 performs the initial setting of the performance counter 34 in the CPU core 18-1 and starts the measurement of the performance counter 34.

When the kernel 80 switches the process (for example, when switching from the process 82-1 to the process 82-2), the kernel 80 saves the value of the performance counter 34 in the CPU core 18-1 to the region 84-1 in the process structure 80-1 and then restores the value saved in the region 84-2 in the process structure 80-2 to the performance counter 34 in the CPU core 18-1.

In addition, the kernel 80 periodically records the value of the performance counter 34 to the process structures 80-1 and 80-2. For example, a timer interrupt is used for the periodically recording process. This process is able to determine the maximum power consumption of the program, as described in FIG. 10, FIG. 11 and FIG. 13.

Further, when the kernel 80 records the value of the performance counter 34 and the process will change, the value of the performance counter 34 is saved and restored to and from the process structures 80-1 and 80-2. Therefore, it is possible to continue the analysis processing of the power consumption even when the execution of the process has been moved to another CPU core.

In addition, after the execution of the program has completed, the power consumption or the maximum power consumption of the program is calculated. Using the value of the performance counter 34 that is recorded in the process structures 80-1 and 80-2 in the kernel 80, the power consumption or the maximum power consumption for each process program are calculated. Therefore, the analysis process is applied to the case of multi-process, and to the case of multi-core further.

Calculation Process of Usage Amount by Adding the Power Consumption

Figure 16:
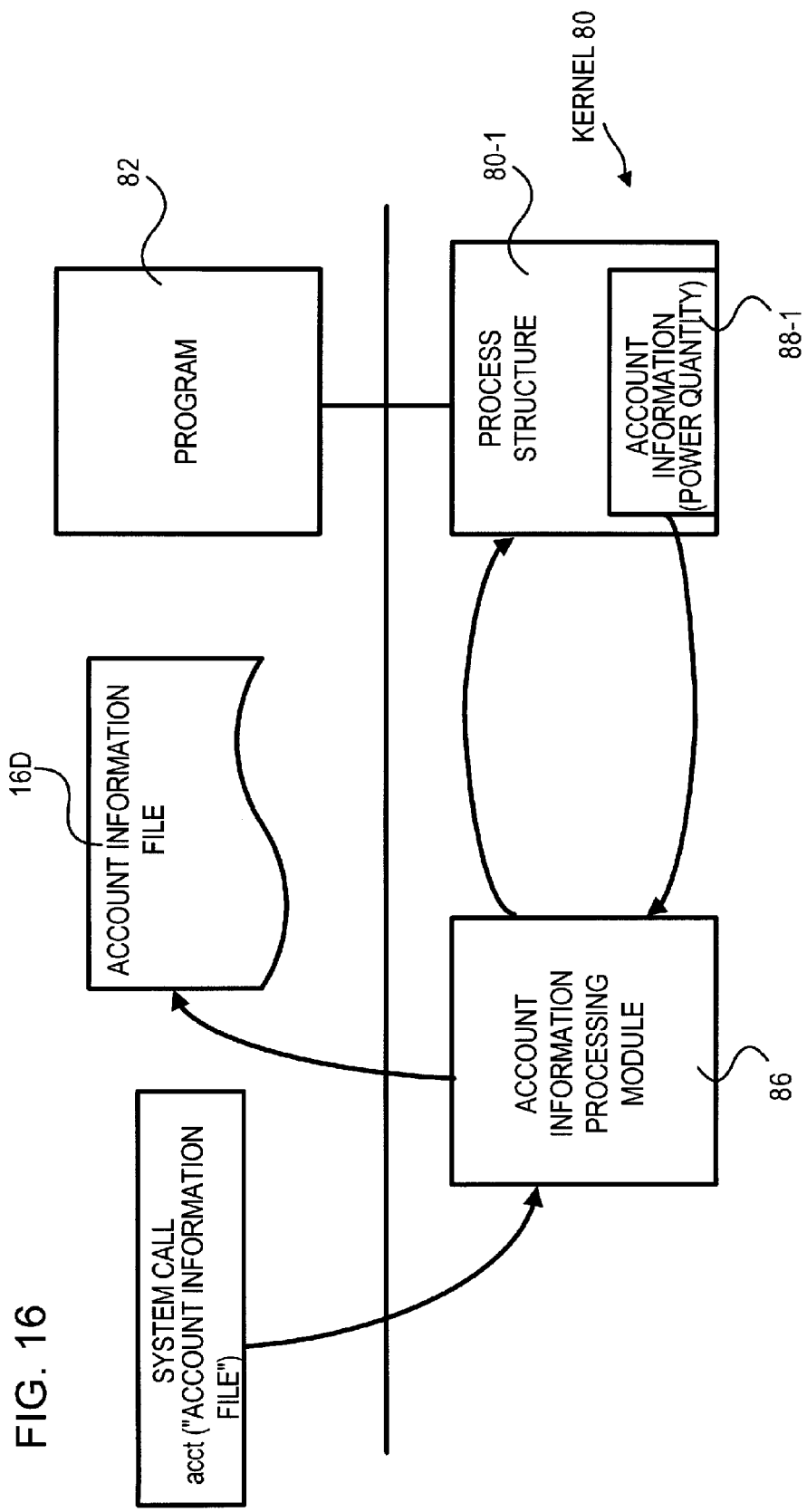
FIG. 16 is a block diagram of usage calculation process according to an embodiment.

FIG. 16 is a block diagram of modules for calculating process of the usage amount according to an embodiment. In FIG. 16, same elements described in FIG. 7 and FIG. 12 are indicated by same symbols. FIG. 16 represents account process modules in UNIX (registered trademark), for example. As depicted by FIG. 16, the account information structure (data) 88-1 is provided to the process structure 80-1 in the kernel 80 of the OS. The account information structure 88-1 holds a CPU usage time and the number of bytes transferred to I/O, etc. for each process program 82.

The account process module 86 is provided in the OS. The account process module 86, in response to system call (acct) instruction, retrieves the held data from the account information structure 88-1, calculates the account (billing), and outputs the calculated result to a account information file 16D.

Figure 17:
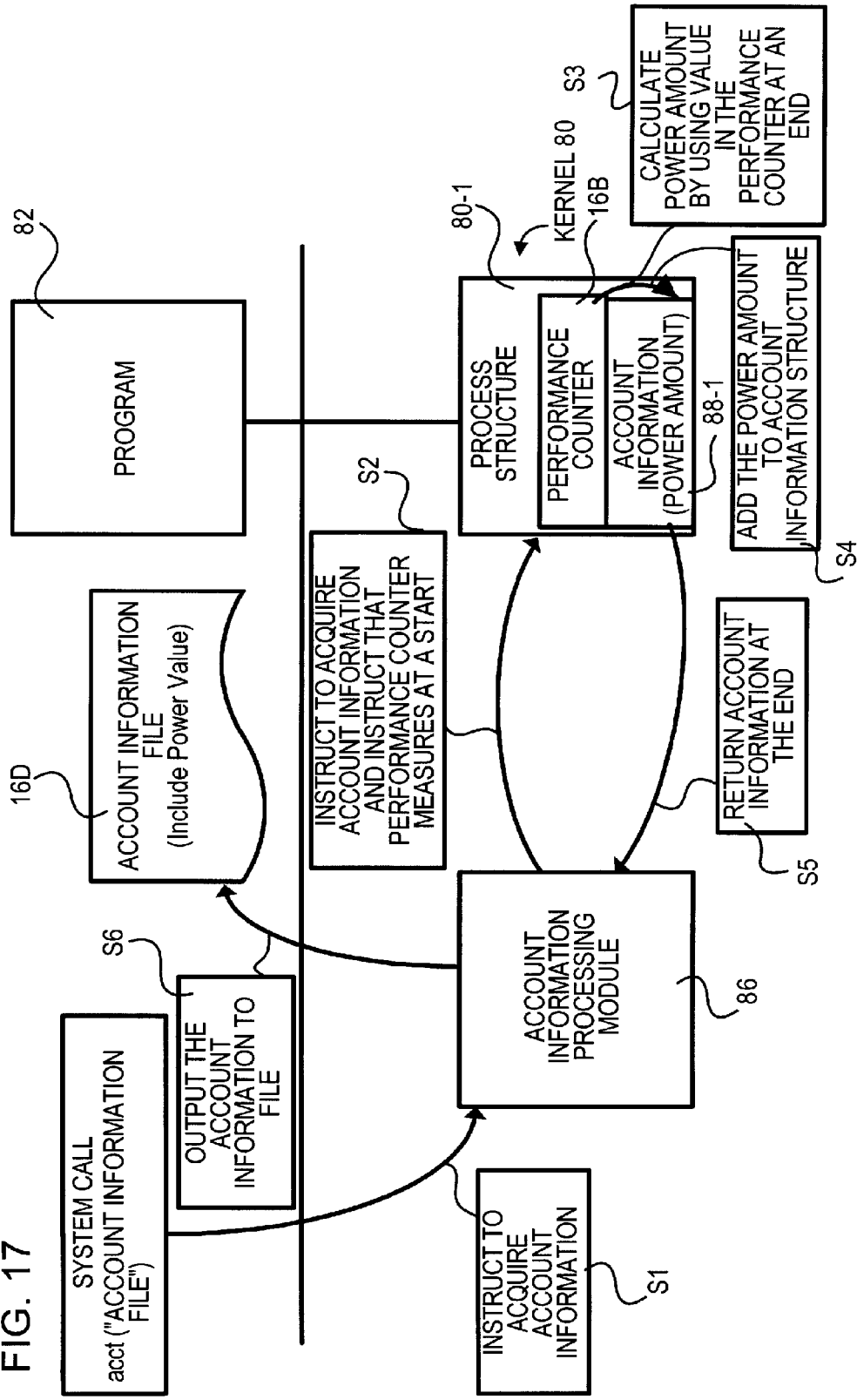
FIG. 17 is an explanatory diagram of the usage calculation process in FIG. 16.

FIG. 17 is an explanatory diagram of the account process in FIG. 16. FIG. 18 is an explanatory diagram of the account information structure 88-1 in FIG. 16 and FIG. 17. FIG. 19 is an explanatory diagram of the account information file 16D in FIG. 16 and FIG. 17.

FIG. 17 illustrates the process of storing the power consumption or the maximum power consumption which was obtained for each process from the relationship between the event and the power consumption to the account information structure and outputting the contents in the account information structure to a file after the execution of the program. As illustrated in FIG. 17, the accounting information structure 88-1 is provided in the process structure 80-1 in the kernel 80 of the OS.

As depicted by FIG. 18, the account information structure 88-1 includes a user ID (int ac_uid), a user CPU usage time (int ac_utime), system CPU usage time (int ac_stime), actual time (int ac_etime) elapsed from a start to an end, average memory usage (int ac_mem) and power consumption (int ac_power). That is, the account information structure 88-1 is added an area for storing power consumption.

The user CPU usage time is a time that the CPU 10 took to execute the user's program. The system CPU usage time is a time that the CPU system (the system controller 12 and memory 14) is required to execute the user's program. The actual time elapsed from the start to the end is an actual time that elapses from the start to the end of the program. The average memory usage is an average usage of the memory in the main storage device which is used by the program.

As depicted by FIG. 17, the system call for outputting the account information outputs an instruction of acquire of the account information to the account process module 86 (indicated by S1 in FIG. 17). The account process module 86 instructs the instruction of acquire of the account information and the instruction of measuring the performance counter to the process structure 80-1 at a start of target program (indicated by S2 in FIG. 17).

As mentioned above, the kernel 80 transfers the control right to the process program 82, then the CPU 10 runs the program 82, and the performance counter 34 in the CPU core 18-1 measures the number of events. The process program 82 or the kernel 80, at the end of the execution of the process program 82, stores the number of events in the performance counter 34 to the number of event storage area 16B that are developed in the main storage device 14. In this example, the number of events in the performance counter 34 is stored in the performance counter area of the process structure 80-1 that is developed on the main storage device 14. And the account process module 86 calculates the power consumption or the maximum power consumption of the target process by using the value in the performance counter area (as indicted by 16B in FIG. 17) of the process structure 80-1 (indicated by S3 in FIG. 17).

The account process module 86 stores calculated power consumption to the account information structure 88-1 (indicated as S4 in FIG. 17). The account process module 86 outputs the contents of the account information structure 88-1 to the account information file which is specified by the system call.

FIG. 19 is an explanatory diagram of the account information file 16D. The account information file 16D is stored the user name, the number of executed command "v", actual-time "w", an execution time "x", an average memory usage "y" and power consumption "z" for each user. The actual time "w" indicates an actual time that elapsed from the start to the end in FIG. 18, and the execution time indicates to (the user CPU time+the system CPU time) depicted by FIG. 18.

Furthermore, the account process module 86 calculates the accounting value from the number of executed command "v", the actual-time "w", the execution time "x", the average memory usage "y" and the power consumption. For example, the account process module 86 calculates the accounting value by a following formula (1).

$$\text{The account value}=A\times v+b\times w+c\times x+d\times y+e\times z \quad (1)$$

In the formula (1), parameters "a", "b", "c", "d" and "e" are parameters determined by the computer center.

In the embodiment, by an enhancement of the conventional account information processing, it is possible to handle the power consumption. In addition, the maximum power consumption may be used instead of the power consumption, and the combination with the power consumption and the maximum power consumption may be used.

Third Embodiment of the Analysis of Power Usage Amount

Figure 20:
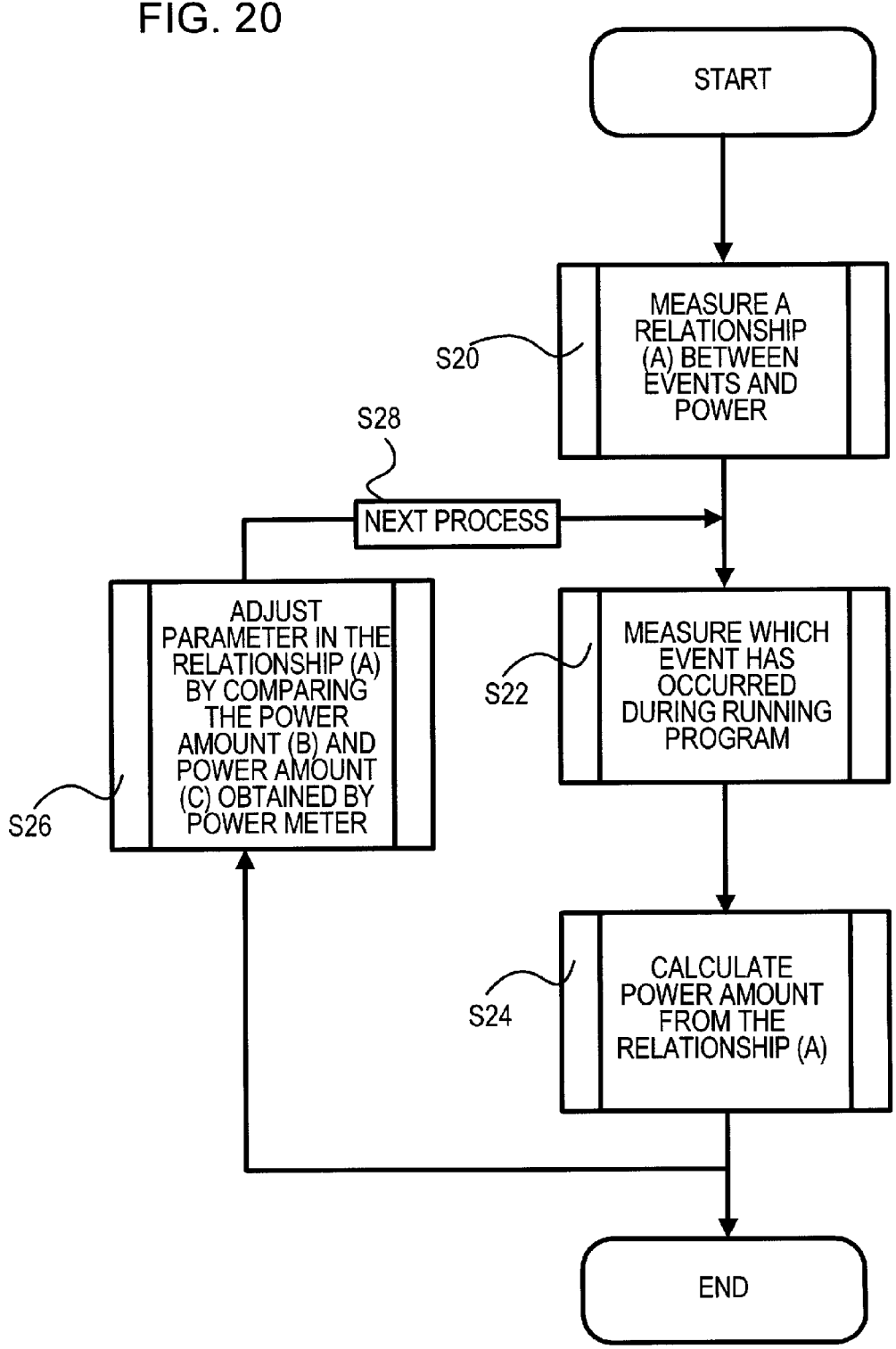
FIG. 20 is a process flow diagram of power consumption analysis according to a second embodiment in FIG. 2.

FIG. 20 is a flow diagram of power analysis processing according to the third embodiment. The third embodiment is configured to dynamically change the relationship between an event and power consumption. That is, because it is not limited that the relationship between the event and the power consumption forms a linear, there may be errors in the relationship between the event and the power consumption. The third embodiment indicates to compare the power consumption which was analyzed according to the first embodiment the power consumption obtained by the power meter and adjust (feed back) the relationship between the event and power consumption. This allows to reduce the error in the relationship between the event and the power consumption.

First, the information processing system is configured by the configuration in FIG. 1 and FIG. 2 which is added an I/O port 70 and a power meter 19 described in FIG. 5.

(S20) As similar processing of S10 of the first embodiment in FIG. 3, the power consumption per unit time for each event are measured.

(S22) The number of events that occurred are measured for each execution of the program by the processing similar to that of S12 of the first embodiment in FIG. 3.

(S24) In the same manner as in S14 of the first embodiment in FIG. 3, the power consumption "B" of the program is calculated from the power consumption per unit time and the number of events which was measured. In the embodiment, the power consumption per unit time for each event are used. For example, when the power consumption (relationship A) per unit time for the number of occurrence of an event "i" is "ai" and "ei" is the number of event "i" that occurred during a certain time t, the power consumption WB at that time is represented by a below formula (2).

$$WB = \Sigma(ai \times ei) \qquad (2)$$

During the execution of the program, the power consumption "WC" per unit time for each event are measured by using the power meter 70 as similar to the step S10. Then, as described with reference to FIG. 17 through FIG. 19, the account process module 86 calculates the usage of the program such as the account information and outputs the usage to the account information file 16D.

(S26) Next, the account process module 86 compares the power consumption WB which was measured from the number of events with the power consumption WC which was measured by the power meter 70 and adjusts the parameter "ai" of the power consumption (Relationship (A)) per unit time. For example, the parameter "ai" is updated to the new parameter new "ai" by the following formula (3).

$$\text{new "ai"} = \text{old "ai"} + \alpha \times (WC - WB) \times (ei/\Sigma ei) \qquad (3)$$

In addition, "ei" in the formula (3) indicates to the number of events described above. The formula (3) means that the parameter "ai" in the relationship (A) is greater when the power consumption WC measured by the power meter 70 during the program execution is greater than the power consumption WB which was calculated. Further, a parameter "α" in the formula (3) is a gain, and a feedback system oscillates when the parameter "α" is set to a very large value. Therefore, it is preferred that a value of the parameter "α" is about "0.1" for example.

(S28) And the next process program will be executed, the process returns to the step S22, and the updated new parameter "ai" is used.

Further, in the formula (3) a fixed value is not considered to calculate the power consumption, but there is the power for fixedly consuming such as leakage current. For this reason, a fixed value is added to the calculation of the power consumption. For example, when the power b is a fixed value, the formula (2) for calculating the power consumption is changed to the following formula (4).

$$WB = \Sigma(ai \times ei) + b \times t \qquad (4)$$

In addition, a time "t" in the formula (4) indicates to the execution time of the program.

Further, similarly to the formula (3), the parameter of the fixed value "b" is adjusted. For example, the parameter new "b" is calculated by below formula (5).

$$\text{new "b"} = b + \beta \times (WC - WB)/t \qquad (5)$$

The formula (5) means that the parameter "b" is greater when the power consumption WC measured by the power meter 70 during the program execution is greater than the power consumption WB which was calculated. Further, a parameter "β" in the formula (5) is a gain, and a feedback system oscillates when the parameter "β" is set to a very large value.

Above feedback formulas (3) and (5) are exemplary, and the other feedback formula may be applied. Further, there is no need that the calculation formula be fixedly built into the system, and the user (user, administrator) can be changed the formula, when the formula is described in software (program).

In this way, the power consumption that is analyzed is compared with the power consumption that is actually measured by the power meter, and the relationship between the event and power consumption is adjusted (feedback). As a result, it is possible to reduce the error in the relationship between the event and the power consumption. In particular, it is effective when the power consumption of the information processing system changes due to the environmental change such as temperature change.

Other Embodiments

In the above embodiments, the information processing system has been described in system a plurality of system boards, but the information processing system can be applied to other information processing system having one or more system boards. Further, the CPU chip 10 has been described in a CPU chip having four CPU cores, for example, the CPU chip may be applied the CPU chip having one or more CPU cores.

Because the usage of the program is calculated from the usage of the arithmetic processing unit which executes the program and the power consumption, it is possible to calculate a fair usage of the information processing system. Further, because the performance counter is initialized at a start of the execution of the program and the power consumption of the program is calculated from the number of times for each event in the performance counter at an end of the execution of the program and the power consumption when each events occurred in the arithmetic processing unit which was pre-measured, it is possible to calculate the usage of the information processing apparatus which has validity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A method of analyzing usage amount of an information processing device, the method comprising:

initializing a performance counter in a processing unit constructed of hardware components, that counts a number of times for each event of events that occur by execution of a program, at a start of the execution of the program by the processing unit;

starting counting in the performance counter of the number of times each event occurs during the execution of the program by the processing unit;

reading the number of times for each event in the performance counter at a completion of the execution of the program by the processing unit;

calculating a program power amount of the program from power consumption previously measured at a time of occurrence of each event in the processing unit which is stored in the storage unit and the number of times of the events which is read by the processing unit, including calculating an event power amount of each event from the start of the execution of the program until the completion of the execution of the program, according to the power consumption of each event and the number of times for each event obtained by said reading, and calculating the program power amount of the program from the start of the program until the completion of the program, according to a sum of the event power amount of each event; and calculating a program usage amount of the information processing device in executing the program for the user from a hardware usage amount of hardware in the information processing device, measured from the start of the program until completion of the program, and the program power amount.

2. The method according to claim 1,
wherein said reading comprises:
periodically observing the number of times of each event in the performance counter during the execution of the program; and
storing the number of times each event was periodically observed in the storage unit, and
wherein said calculating of the program power amount comprises calculating an observed power amount of the program for each observing time according to the number of times of each event which is stored in the storage unit and the power consumption at the time of the occurrence of each event by the processing unit.

3. The method according to claim 1, wherein the method further comprises:
executing a test program that causes each of the events by the processing unit;
measuring the number of times of each event in the performance counter after a completion of the execution of the test program;
measuring a supplied power amount by a power meter that measures power supplied to the processing unit;
calculating the power consumption at the occurrence of each event of the processing unit from the number of times of each event and the supplied power amount measured by the power meter; and
storing the power consumption at the occurrence of each event in the storage unit.

4. The method according to claim 1, wherein the reading comprises reading the number of times of each of at least an integer arithmetic event, a floating point arithmetic event, a cache miss event and a TLB miss event in the performance counter in the storage unit at the completion of the execution of the program.

5. The method according to claim 1, wherein the method further comprises:
executing a plurality of programs by the processing unit;
saving a count value of the performance counter by the execution of one program among the plurality of programs to the storage unit when switching from the execution of the one program to the execution of another program among the plurality of programs during the execution of the plurality of programs by the processing unit; and
restoring the count value of the one program that is saved in the storage unit to the performance counter when switching from the execution of another program to the execution of the one program by the processing unit.

6. The method according to claim 1, wherein the method further comprises:
calculating the event power amount at the occurrence of each event of the processing unit from the number of times of each event in the performance counter and the power consumption of each event stored in the storage unit;
comparing a supplied power amount measured by a power meter that measures power supplied to the processing unit with the event power amount; and
updating the power consumption of each event stored in the storage unit according to a result of said comparing.

7. The method according to claim 1, wherein the initializing comprises initializing the performance counter in response to an instruction of an account for the execution of the program.

8. An information processing system, comprising:
a processing unit, constructed of hardware components, that executes a program that has been requested by a user and having a performance counter which counts a number of times for each event of events that occur by the execution of the program; and
a storage unit that stores power consumption at a time of occurrence of each event in the processing unit which are pre-measured,
wherein said processing unit
initializes the performance counter at a start of the execution of the program,
starts counting by the performance counter of the number of times each event occurs,
reads the number of times of each event counted by the performance counter at a completion of execution of the program,
calculates an event power amount of each event from the start of the program until the completion of the program, according to a measured power consumption stored in the storage unit and the number of times of each event which is read,
calculates the program power amount of the program from the start of the program until the completion of the program, according to a sum of the event power amount of each event, and
calculates a program usage amount of the information processing device in executing the program for the user from a hardware usage amount of hardware in the information processing device, measured from the start of the program until completion of the program, and the program power amount.

9. The information processing system according to claim 8, wherein the processing unit periodically observes the number of times of each event in the performance counter during the execution of the program, stores the number of times each event was periodically observed in the storage unit and calculates an observed power amount of the program for each observing time from the number of times of each event which is stored in the storage unit and the power consumption at the time of the occurrence of each event.

10. The information processing system according to claim 8, wherein the processing unit executes a test program that causes each of the events, measures the number of times of each event in the performance counter after completion of the execution of the test program, measures a supplied power amount of a power meter that measures power supplied to the processing unit, calculates the power consumption at the occurrence of each event of the processing unit from the number of times of each event and the supplied power amount measured by the power meter, and stores the power consumption at the occurrence of each event in the storage unit.

11. The information processing system according to claim 8, wherein the processing unit stores the number of times of each of at least an integer arithmetic event, a floating point arithmetic event, a cache miss event and a TLB miss event in the performance counter in the storage unit at the completion of the execution of the program.

12. The information processing system according to claim 8, wherein the processing unit
executes a plurality of programs,
saves a count value of the performance counter by the execution of one program among the plurality of programs to the storage unit when switching from the execution of the one program to the execution of another program among the plurality of programs during the execution of the plurality of programs, and
restores the count value of the one program that is saved in the storage unit to the performance counter when switching from the execution of another program to the execution of the one program.

13. The information processing system according to claim 8, wherein the processing unit calculates the event power amount at the occurrence of each event of the processing unit from the number of times of each event in the performance counter and the power consumption of each event stored in the storage unit, compares a supplied power amount measured by a power meter that measures power supplied to the processing unit with the event power amount, and updates the power consumption of each event stored in the storage unit according to a comparison result.

14. The information processing system according to claim 8, wherein the processing unit initializes the performance counter in response to an instruction of an account for the execution of the program.

15. A non-transitory computer readable recording medium having stored therein a program for causing a computer to execute a digital signature process comprising:
initializing a performance counter in a processing unit that counts a number of times for each event that events occur by execution of a program at a start of the execution of the program according to a request of a user;
reading the number of times for each event in the performance counter at a completion of the execution of the program in a storage unit;
calculating a program power amount of the program from power consumption previously measured at a time of occurrence of each event in the processing unit which is stored in the storage unit and the number of times of the events which is read, including
calculating an event power amount of each event from the start of the execution of the program until the completion of the execution of the program, according to the power consumption of each event and the number of times for each event obtained by said reading, and
calculating the program power amount of the program from the start of the program until the completion of the program, according to a sum of the event power amount of each event; and
calculating a program usage amount of an information processing device in executing the program for the user from a hardware usage amount of hardware in the information processing device, measured from the start of the program until completion of the program, and the program power amount.

16. The non-transitory computer readable recording medium according to claim 15, wherein the process comprises initializing the performance counter in response to an instruction of an account for the execution of the program.

* * * * *